No. 762,399. PATENTED JUNE 14, 1904.
C. L. GOEHRING & W. TROCHE.
GLASS GRINDING MACHINE.
APPLICATION FILED AUG. 20, 1903.
NO MODEL. 6 SHEETS—SHEET 1.
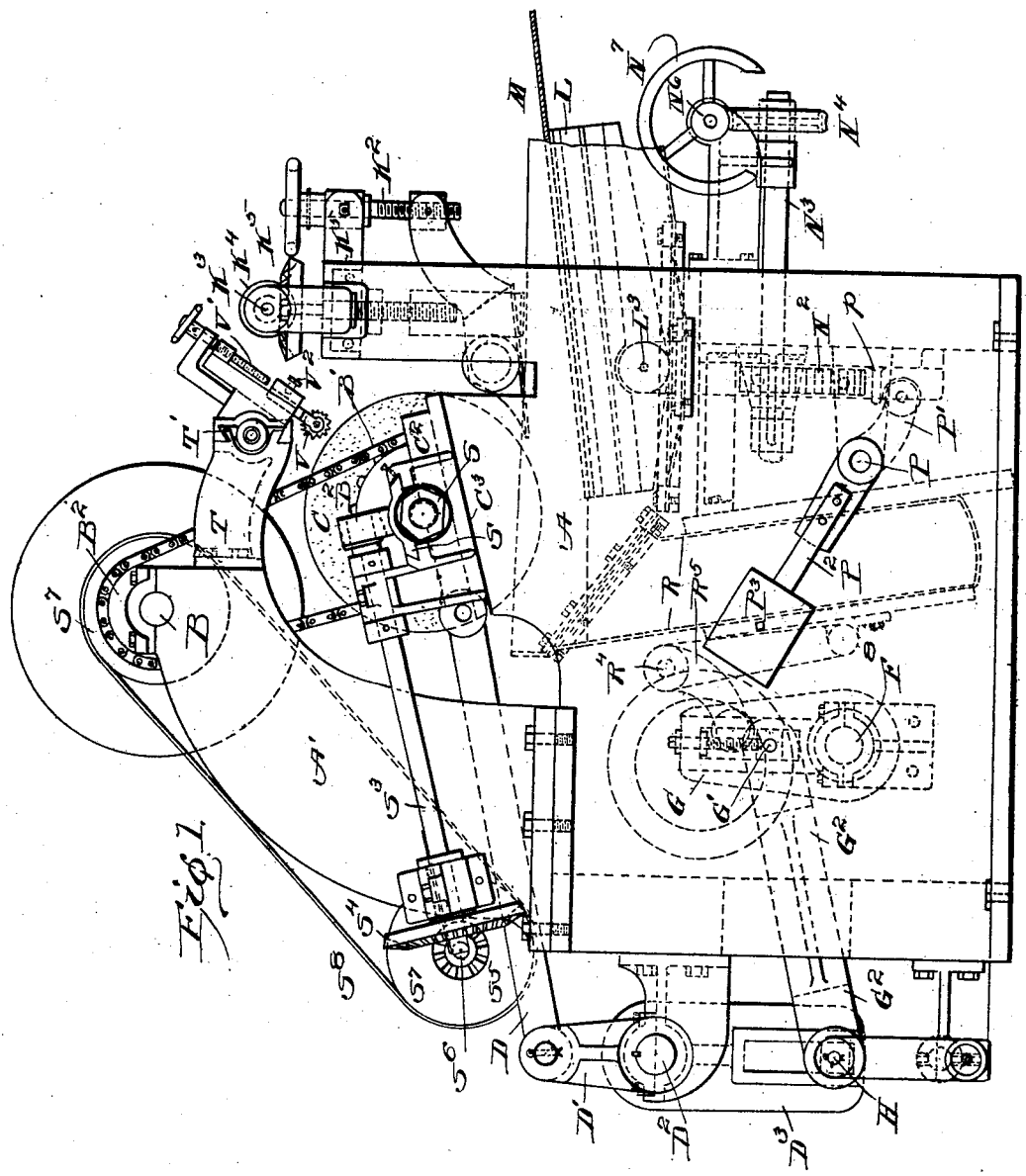

No. 762,399. PATENTED JUNE 14, 1904.
C. L. GOEHRING & W. TROCHE.
GLASS GRINDING MACHINE.
APPLICATION FILED AUG. 20, 1903.
NO MODEL. 6 SHEETS—SHEET 2.
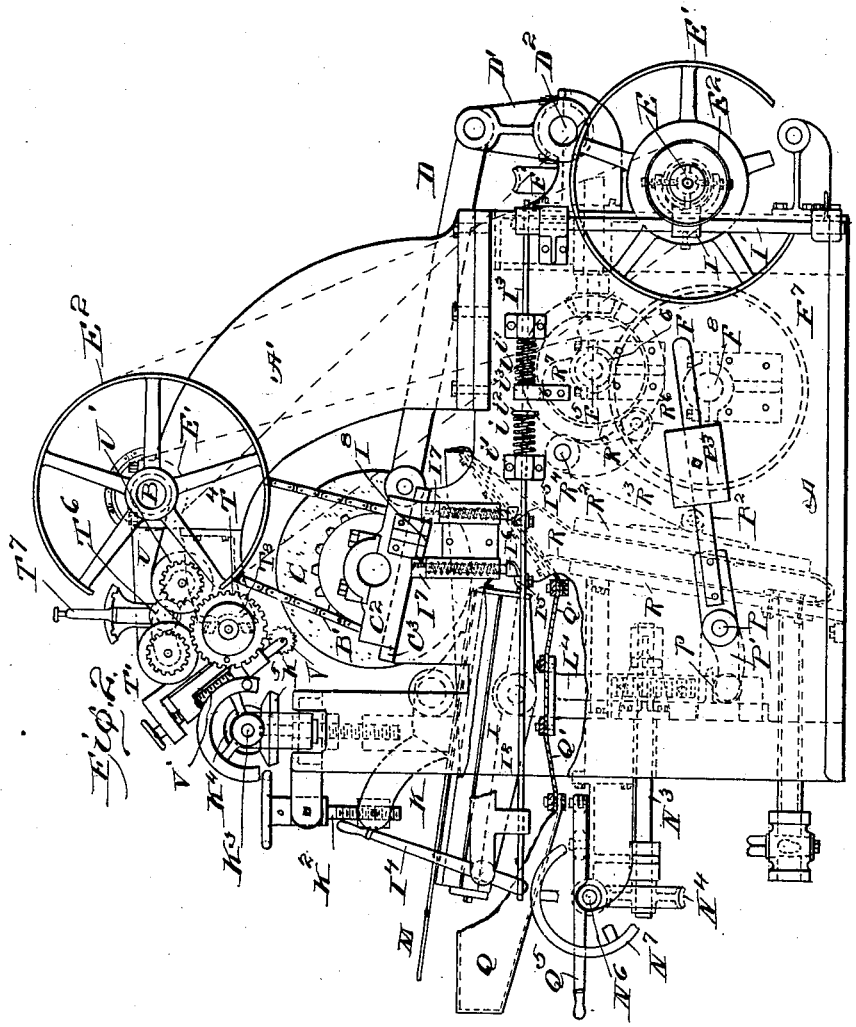

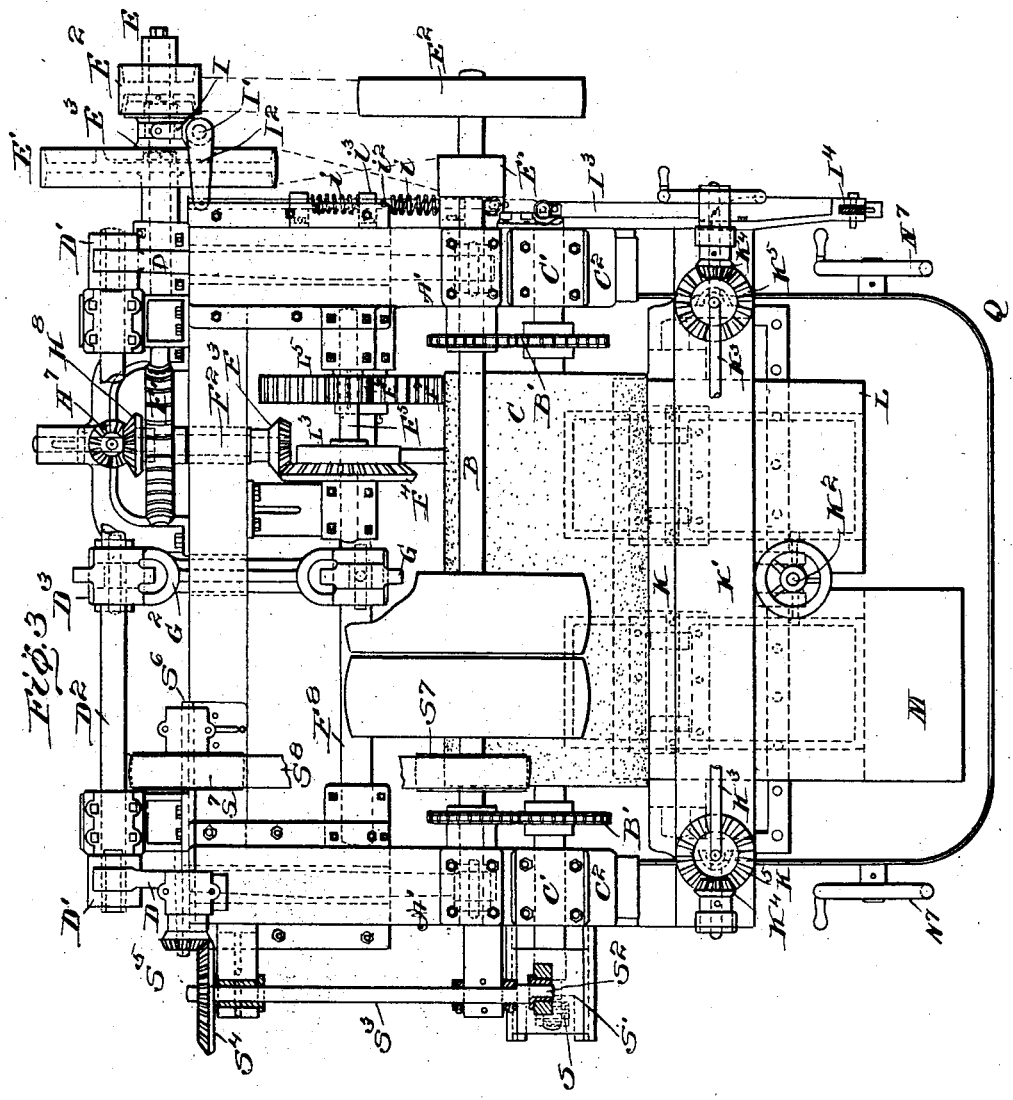

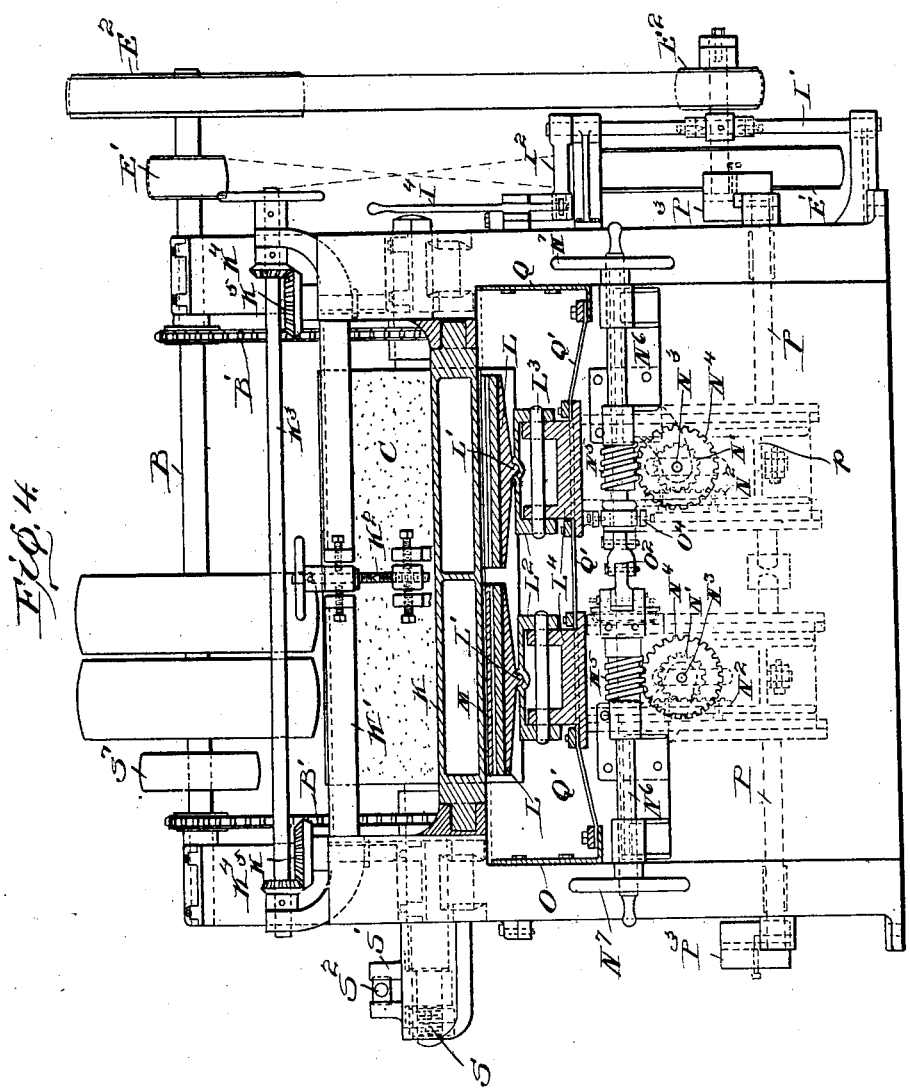

No. 762,399. PATENTED JUNE 14, 1904.
C. L. GOEHRING & W. TROCHE.
GLASS GRINDING MACHINE.
APPLICATION FILED AUG. 20, 1903.
NO MODEL. 6 SHEETS—SHEET 5.
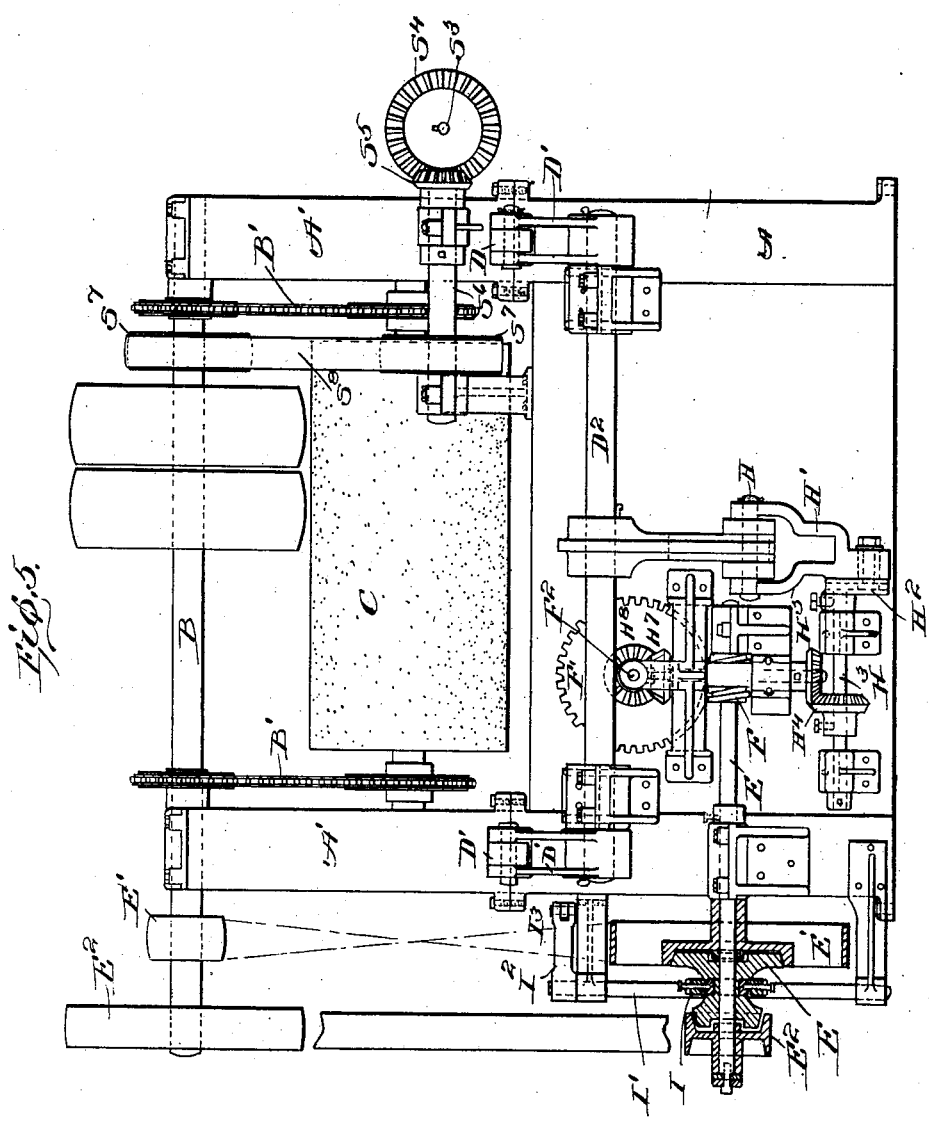

No. 762,399. PATENTED JUNE 14, 1904.
C. L. GOEHRING & W. TROCHE.
GLASS GRINDING MACHINE.
APPLICATION FILED AUG. 20, 1903.
NO MODEL. 6 SHEETS—SHEET 6.
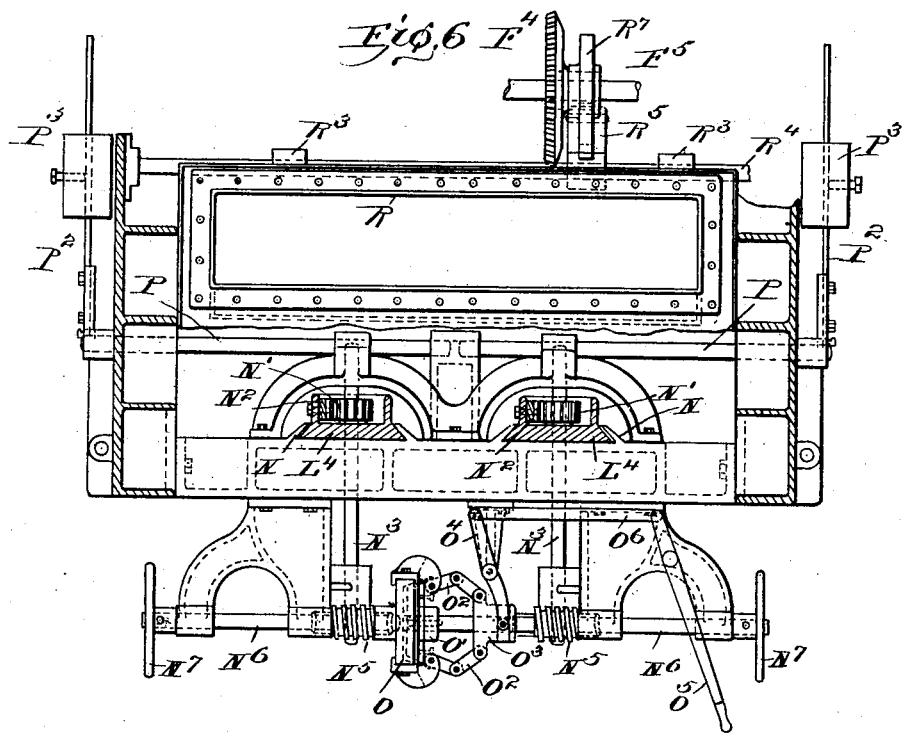
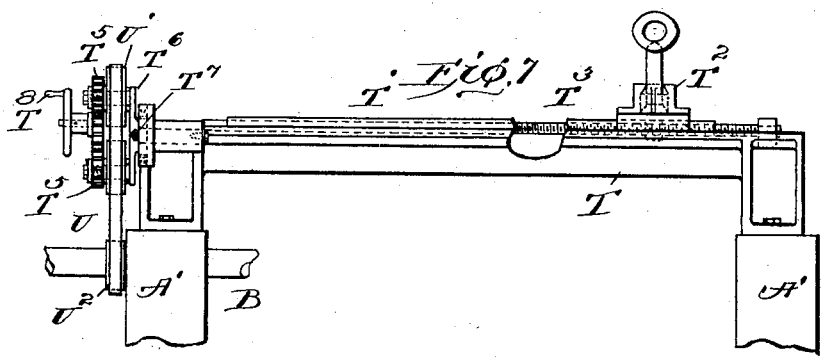
Witnesses
J. M. Fowler Jr.
Thomas Durant
Inventors
Charles L. Goehring
William Troche
By Church & Church
Their Attorneys No. 762,399. Patented June 14, 1904.

UNITED STATES PATENT OFFICE.

CHARLES L. GOEHRING AND WILLIAM TROCHE, OF AKRON, OHIO; SAID TROCHE ASSIGNOR TO SAID GOEHRING.

GLASS-GRINDING MACHINE.

SPECIFICATION forming part of Letters Patent No. 762,399, dated June 14, 1904.

Application filed August 20, 1903. Serial No. 170,186. (No model.)

*To all whom it may concern:*

Be it known that we, CHARLES L. GOEHRING and WILLIAM TROCHE, of Akron, in the county of Summit, State of Ohio, have invented certain new and useful Improvements in Glass-Grinding Machines; and we do hereby declare the following to be a full, clear, and exact description of the same, reference being had to the accompanying drawings, forming a part of this specification, and to the letters of reference marked thereon.

This invention relates to improvements in glass-grinding machinery, and more especially to machinery for beveling plates by grinding, although features of the invention are applicable to glass-grinding generally.

The objects of the invention are to simplify and cheapen the mechanical construction and arrangement of the parts, to facilitate the handling of the glass, and to permit of an increased output being beveled.

The invention consists in certain novel details of construction and combinations and arrangements of parts, all as will be now described, and the particular features of novelty pointed out in the appended claims.

Referring to the accompanying drawings, Figure 1 is an elevation of a beveling-machine embodying the present improvements looking at the left-hand side. Fig. 2 is a similar view looking at the right-hand side of the machine, portions of the frame being broken away to disclose underlying parts, some of the latter being in section. Fig. 3 is a top plan view. Fig. 4 is a front elevation with the bed, clamps for the glass, and some of the associated parts in section. Fig. 5 is a rear elevation with some of the parts in section. Fig. 6 is a horizontal section through the front portion of the machine with some of the parts in elevation. Fig. 7 is a detail top plan view of the grinder dressing mechanism.

Like letters of reference in the several figures indicate the same parts.

By reference to Figs. 1, 2, and 3 it will be seen that the working parts of the machine are mounted in a frame A of approximately rectangular form and having an overhang or upwardly-extending arms A', in which the main drive-shaft B is journaled. The grinder C, which in the present instance is in the form of a cylinder, is located below the level of the main drive-shaft and is supported in bearings C', through which the shaft of the grinder passes, and said bearings are in turn mounted on or form portions of a carriage or carriages $C^2$, adapted to slide on ways $C^3$, extending in the plane of the bevel or surfaces to be ground, and preferably formed on the upper edges of the side portions of the frame A. As shown, the ways $C^3$ extend diagonally upward toward the front of the machine, and the grinder has a movement thereon corresponding to the necessary traverse in cutting a bevel from one edge to the other of the ground surface. Rotation is imparted to the grinder by drive-chains B' running over sprocket-wheels $B^2$ on the drive-shaft and grinder-shaft, respectively, a sufficient slack being left in said chains to permit the grinder to move on the ways $C^3$, as well as to move longitudinally of its axis, as will be hereinafter pointed out. The power for moving the grinder on the ways $C^3$ or causing it to traverse with respect to the work is transmitted to the carriages $C^2$ by connecting-rods D, extending back to the rear of the machine and jointed to crank-arms D' on a transverse rock-shaft $D^2$. The rock-shaft $D^2$ is oscillated through gearing and driving connections with a secondary drive-shaft E, the latter receiving its motion from the main drive-shaft B through suitable pulleys E' E' and $E^2$ $E^2$, the belt connecting the pulleys E' E' being a crossed belt whereby the pulleys E' $E^2$ on the shaft E will be rotated in opposite directions. It will be understood that said pulleys E' $E^2$ on the shaft E are loose thereon, and the connection between said pulleys and the shaft E is effected by the clutch shown in section in Fig 5 at $E^3$, which clutch when moved in one direction longitudinally of the shaft will effect the engagement of one of the pulleys and when moved in the opposite direction will effect the engagement of the other of the pulleys, both pulleys being free when the clutch is in an intermediate position. The shaft E carries a worm F, meshing with a worm-gear F' on a short shaft $F^2$, journaled in the main frame and carrying at its forward end a beveled pinion $F^3$, meshing with a bevel-wheel $F^4$ on a transverse shaft $F^5$. The latter shaft $F^5$ carries a pinion $F^6$, meshing with a gear $F^7$ on a second transverse shaft $F^8$, preferably extending entirely across the frame of the machine and having a central crank-arm G, provided with an adjustable crank-pin $G'$, Fig. 1, to which a link or connecting-rod $G^2$ is jointed at one end. The opposite end of said link or connecting-rod is connected with a central crank-arm $D^3$ on the shaft $D^2$, before described. The connections between the connecting-rod or link $G^2$ and the crank-arm $D^3$ is a shiftable connection, whereby the said connection may be moved nearer to or farther from the axis of the shaft $D^2$ to effect a relatively rapid or slow traverse of the grinder. The mechanism illustrated is designed to give the grinder a rapid movement during the initial and final portions of its traverse with a slower intermediate movement. The reason for this is that during the initial and final portions of the movement the work done by the grinder and friction between the grinder and glass is relatively light, and, as a consequence, the grinder may be advanced with rapidity; but during the time the grinder is removing the greatest thickness of glass the friction and resistance are great and the grinder should be given a correspondingly slow movement of traverse, both in order to effect a more perfect grinding and to prevent stalling the machine or breaking the glass by excessive pressure. The movements referred to are automatically accomplished by automatically shifting the connection between the link $G^2$ and crank-arm $D^3$, for which purpose the said connection is formed by a shaft H, mounted on the upper end of a link or fork $H'$, Fig. 5, the latter in turn being carried by a crank-arm $H^2$ on a short transverse shaft $H^3$. The shaft $H^3$ carries a bevel-gear $H^4$, meshing with a corresponding gear $H^5$ on a vertical shaft $H^6$. Shaft $H^6$ carries a bevel-gear $H^7$, meshing with a bevel-gear $H^8$ on the shaft $F^2$. The gearing between the shafts $F^2$ and $H^3$ are so proportioned that the said shafts will be rotated in unison and when the stone or grinder is at either extreme of its traverse the crank $H^2$ is turned to its highest position or with the connection between the link $G^2$ and crank-arm $B^3$ in its position of adjustment nearest the shaft $D^2$. During the traverse of the stone the shaft $H^3$ will have made one complete revolution and the said connection will have been moved first down or away from the shaft $D^2$, thereby gradually decreasing the speed of grinder traverse until a minimum is reached half-way between the extreme of the movement and then back to its initial position, again increasing the speed of the movement to its maximum. The proportioning of the gearing between the shaft $F^2$ and the shaft $F^8$ is preferably such that one complete rotation of the shaft $F^2$ will move the shaft $F^8$ through approximately one-eighth of a revolution. The movement of the shaft $F^8$ through this portion of the arc of a circle gives a practically uniform thrust and speed to the outer end of the connecting-rod $G^2$ and in range is sufficient to effect the desired traverse of the grinder.

As before stated, the traverse movements of the grinder are controlled by the clutch $E^3$, and in order to automatically arrest the movement at the proper time and to permit of the inauguration of the movements by the attendant the said clutch is controlled by a clutch-arm I, mounted on a vertical shaft $I'$, having at its upper end an operating-arm $I^2$, connected to the rear end of a shifting rod $I^3$, mounted in suitable guides on the frame and provided at its forward end with an operating-lever $I^4$, by which the attendant may shift the clutch in one direction or the other. On the rod $I^3$ are two oppositely-located springs $i$, held between bearings $i'$ on the frame, and between which springs is a pin or projection $i^2$ on the rod $I^3$. These springs serve to bring the rod back into position with the clutch $E^3$ central, no matter in which direction the said rod is moved, and to insure the proper positioning of the clutch the pin or projection $i^2$ works through a fork or stop $i^3$ on the frame and normally rests within the same, while the ends of the springs $i$ seat against said fork $i^3$, from which it follows that when in its intermediate position the said pin or projection is free from the springs; but when moved in one direction or the other it will compress one or the other of the springs, leaving the opposite spring unaffected. When the attendant throws the clutch into engagement with one or the other of the pulleys by shifting the rod $I^3$, the clutch is retained in engagement by projections $I^5$ on the rod $I^3$ engaging spring-pressed pawls or stops $i^6$, mounted on the frame, preferably above the rod $I^3$, and having at their upper ends heads or overhanging parts $I^7$, beneath which a knock-off projection or incline $I^8$ on the carriage $C^2$ is adapted to pass as said carriage reaches one or the other of the extremes of its movement. As the knock-off projection lifts the pawl or stop $I^6$ the clutch-rod is released and the springs automatically shift the clutch to its intermediate position, this movement being effected when the carriage and grinder are moved in either direction, and as a result while the attendant inaugurates the traverse movement of the grinder such movement is automatically arrested at the proper instant and the attendant must inaugurate a movement in the opposite direction. The pulleys $E'$ $E'$ and $E^2$ $E^2$ are so proportioned as to give a somewhat slow advance movement to the grinder and a relatively rapid return or reverse movement.

The glass or work to be beveled is preferably clamped against a bed in substantially the manner described in our prior applications, Serial Nos. 159,201 and 159,201½, filed May 28, 1903—that is to say, there is located above the level of the glass or on the same side of the glass with the grinder an adjustable bed K, and the glass is clamped up against said bed by a plurality of clamping means which will properly position and hold the glass during the grinding operation. The bed itself is pivotally mounted in a frame K', its angular position with respect to said frame being determined by an adjusting-screw $K^2$, while the bodily vertical adjustment of the frame and bed is effected by a transverse shaft $K^3$, having miter-gears $K^4$ thereon meshing with miter-gears $K^5$ on the upper ends of adjusting-screws which support the frame K'. Clamps L (preferably two in number) are located below the bed K in position to clamp the glass M against the under face of the bed, said clamps being pivotally mounted, so as to conform readily both to the inclination of the bed or to irregularities in the thickness of the glass held thereon. The pivotal connections of the clamp L are preferably formed by semicylindrical ribs L', Fig. 4, seating in correspondingly-formed grooves in intermediate blocks $L^2$, the latter in turn being pivotally supported on axes at right angles to the ribs L' and formed by pins or shafts $L^3$, carried by the upper ends of vertically-adjustable supports $L^4$. The supports $L^4$ are mounted to slide vertically in ways N on the main frame, (see Fig. 6,) and they are adapted to be adjusted by pinions N' engaging rack-bars $N^2$ on the vertically-adjustable support. The pinions N' are mounted on parallel shafts $N^3$, extending forwardly and carrying at their forward ends worm-gears $N^4$, with which worms $N^5$ on alined transverse shafts $N^6$ are adapted to coöperate. The said shafts $N^6$ are provided on their outer ends with hand-wheels $N^7$, by which the attendant may raise or lower the clamps, as desired. The clamps may be operated in this manner independently, thus adapting the machine for handling separate small plates or to clamp plates of differing thickness; but in order that said clamps may be simultaneously operated the said shafts $N^6$, Fig. 6, may be coupled together by a clutch, the two sections of which (lettered O and O'') are mounted on the proximate ends of the said shafts $N^6$, while the clutch-operating mechanism embodying levers and links $O^2$ and a shifting collar $O^3$ are adapted to be moved by a fork $O^4$, pivoted on the frame and controlled by an operating-lever $O^5$, connected therewith by a link $O^6$, the said lever $O^5$ being in convenient position to be manipulated by the attendant when in proximity to one of the adjusting-wheels $N^7$. To counterbalance the weight of the parts carried by the vertically-adjustable supports $L^4$, transverse shafts P are provided with arms and rollers P', underlying webs $p$ of the supports $L^4$, and at the ends said shafts P are provided with arms $P^2$, projecting in an opposite direction from the arms P' and having adjustable counterbalance-weights $P^3$ thereon.

In the art of glass-grinding, particularly in connection with machinery for effecting a positive feed movement or for forcing the grinding, as in the present machine, it has been found to be highly advantageous to effect the grinding operations beneath the surface of a body of liquid, such as water, and in the present machine I have embodied a construction whereby this may be effected and at the same time during the positioning of the glass or when it is to be inspected at the end of the traverse movement the body of water will be withdrawn to a sufficient extent to expose the glass at the grinding-point. By reference to Figs. 1, 2, 3, and 4 it will be seen that a tank having side walls Q, secured to the rigid frame of the machine, surrounds the grinder, clamps, and bed and extends to a sufficient height to permit of the immersion of the grinder and said other parts, together with the glass, at the grinding-point. The bottom of said tank is preferably formed of flexible material—such, for instance, as rubber or leather Q', Figs. 2 and 4—having its edges firmly clamped to the bottom portions of the sides Q and the portions immediately around the vertically-adjustable supports $L^4$ firmly clamped to said supports, so as to prevent leakage at any of these points, but at the same time to permit said supports to move vertically, either in unison or independently, to the necessary extent. The rear wall of the tank is preferably inclined, as shown in dotted lines, Figs. 1 and 2, and to the walls of an opening formed in this inclined portion of the tank there is clamped the mouth of a depending receptacle R, Fig. 6, such receptacle preferably being compressible or in the form of a flexible bag, with a capacity when distended sufficient to reduce the water-level in the tank to a point below the level of the grinding-point, but when compressed and its contents ejected into the tank to raise the water-level to the desired point above the grinding-level. When in the form of a flexible bag, as illustrated, the receptacle R is preferably clamped against a supporting plate or board R', carried by the frame of the machine, while its opposite side is supported by a movable board or compressor $R^2$, mounted on the end of crank-arms $R^3$, carried by a transverse shaft $R^4$, Figs. 2 and 6. The shaft $R^4$ in turn carries an arm $R^5$, provided with a roller $R^6$, running on the periphery of a cam $R^7$, mounted on the shaft $F^5$ or the hub of the gear-wheel $F^4$, heretofore described. The cam $R^7$ is of such form that the receptacle R is compressed or its area reduced, so as to raise the water-level in the tank at all times, save when the grinder is at the rearmost extreme of its traverse or the parts are in proper position for the glass to be inserted or removed. By withdrawing the water during the time that the glass is to be inserted or removed the floating of the plate, due to the action of the grinder tending to create currents of water which will force the water beneath the plate, is entirely obviated, and, furthermore, the danger of grindings distributing themselves over the clamps when no glass is presented is overcome and the attendant is relieved from the necessity of cleaning and preparing the parts for the reception of a new plate after the removal of each ground plate. A drain-pipe R⁹ opens out from a point near the bottom of the receptacle R to permit of the ready removal of detritus which will accumulate from the grinding operations.

The grinder in addition to its rotary and movements of traverse is given a movement longitudinally of its axis in order to distribute the wear and give a finer surface to the ground plate, and in the machine illustrated this movement longitudinally of its axis is effected by mounting the grinder-shaft in its bearings so as to be capable of a limited longitudinal movement therein. At one end a groove or recess is formed in the shaft, preferably by reducing its diameter somewhat and applying set-nuts S, Figs. 1, 3, 4, to its outer end. The end of the shafts so formed receives a sliding box S', mounted to move in ways on one of the carriages C² in a direction parallel with the axis of the shaft, and this sliding box is moved so as to carry the stone with it by a crank S² on the forward end of a shaft S³. The shaft S³ is splined or connected with a gear-wheel S⁴ by a feather-and-groove connection, so as to be capable of sliding therein to accommodate the traverse movements of the grinder, and the gear S⁴ meshes with a pinion S⁵, mounted on a shaft S⁶, driven from the main drive-shaft by pulleys S⁷ and belt S⁸.

To form true-ground faces, it is very necessary that the grinder should have a true face maintained thereon, and a dressing mechanism forms a part of the present machine, such dresser occupying a position out of the way of other portions of the mechanism and being of such construction that it may be thrown into or out of operation at the will of the attendant. Thus, if desired, the grinder may be dressed during the grinding operation or when the stone is running free. The arms A' are provided at their ends with a frame T, Figs. 1 and 7, formed with ways T' for a dresser-carriage T², adapted to travel parallel with the axis of the grinder and to be moved by a feed-screw T³, journaled in the frame and having a gear-wheel T⁴, Fig. 2, at one end. The gear-wheel T⁴ and feed-screw are rotated in one direction or the other by one or the other of a pair of gears T⁵, mounted in an oscillatory frame T⁶, controlled by a handle T⁷, with a suitable lock to hold one or the other of the gears T⁵ in mesh with the gear T⁴. The gears T⁵ are driven by a belt U, running over pulleys U' on the gears in proper direction to impart opposite rotation to them and over a drive-pulley U² on the main drive-shaft B. The dresser V is adjustable toward and from the grinder by a screw V' and may be clamped in position by a set-screw V².

It will be seen that the dresser may be caused to travel back and forth along the grinder by shifting the handle T⁷ by the power mechanism described, or, if desired, it may be shifted by hand, for which purpose the wheel T⁴ is provided with a handle or hand-wheel T⁸. (Best shown in Fig. 7.)

From the foregoing it will be seen that the mechanism is of such character that it may be produced by ordinary shop manipulations. Thus the cost of producing the machine is reduced to a minimum, and at the same time the parts are so combined that they will stand up under hard and constant usage, permitting the grinding operation to be forced to a high speed. The location of the bed against which the glass is clamped on the same side of the plane of the glass as the grinder permits of the clamping of plates of different or unequal thickness and the production of uniform bevels on all the plates without readjustment, inasmuch as the face of the plate determines the position of the plate with reference to the grinder, and the thickness or inequalities of the plate will not affect the form of the bevel with relation to the said face.

Having thus described our invention, what we claim as new, and desire to secure by Letters Patent, is—

1. In a glass-grinding machine, the combination with a support for the glass and a rotary grinder having a bodily movement of traverse with relation to each other parallel to the plane of the surface to be ground, of a driving mechanism for effecting such traverse movement at a relatively high speed near each extreme of the movement and at a slow speed intermediate such extremes; substantially as described.

2. In a glass-grinding machine, the combination with a support for the glass and a rotary grinder having a bodily movement of traverse with relation to each other parallel to the plane of the surface to be ground, of a driving mechanism for effecting such traverse movement at relatively high speed near each extreme of the movement and at slow speed intermediate such extremes, and stop mechanism for arresting the movement at each extreme; substantially as described.

3. In a glass-grinding machine, the combination with the support for the glass and the grinder mounted to move bodily in a plane parallel with the surface to be ground, of a driving mechanism for effecting such bodily movement at a relatively high speed near each extreme and at a slow speed intermediate such extremes; substantially as described.

4. In a glass-grinding machine, the combination with the support for the glass and the rotary grinder mounted on ways to traverse at right angles to its axis, of a driving mechanism for effecting such traverse embodying a shaft having an arm, a driving connection shiftable on said arm and a reciprocatory controller for shifting said connection whereby the speed of traverse may be varied; substantially as described.

5. In a glass-grinding machine, the combination with the support for the glass and the rotary grinder mounted on ways to traverse at right angles to its axis, of a driving mechanism for effecting such traverse embodying a shaft having an arm, a driving connection shiftable on said arm and mechanism for automatically shifting said connection away from and toward the shaft during each traverse of the grinder; substantially as described.

6. In a glass-grinding machine, the combination with the support for the glass and the rotary grinder mounted on ways to traverse at right angles to its axis, of a driving mechanism for effecting such traverse embodying a rock-shaft having an arm, a reciprocatory driving connection shiftable on said arm, a shaft having a crank thereon and a connection between the crank and reciprocatory driving connection for shifting the same on the arm to vary the speed of traverse; substantially as described.

7. In a glass-grinding machine, the combination with the support for the glass and the rotary grinder mounted on ways to traverse at right angles to its axis, of a driving mechanism for effecting such traverse embodying a rock-shaft having an arm, a reciprocatory driving connection shiftable on said arm, a shaft having a crank thereon, a connection between said crank and reciprocatory driving connection for shifting the same on the arm, a common driving-shaft for said rock-shaft and crank-shaft and stop mechanism for arresting the movement of the driving-shaft at each extreme of the traverse; substantially as described.

8. In a glass-grinding machine, the combination with the rotary grinder mounted on ways to traverse at right angles to its axis parallel with the plane of the surface to be ground, connecting-rods for reciprocating said grinder on its ways, a rock-shaft having arms to which said connecting-rods are jointed, and a driving-arm, of a reciprocatory driving connection shiftable on said arm, an oscillatory shaft for reciprocating said driving connection, means for shifting said driving connection toward and from the rock-shaft and gearing for oscillating the said oscillatory shaft; substantially as described.

9. In a glass-grinding machine, the combination with the rotary grinder mounted on ways to traverse transversely of its axis in the plane of the surface to be ground, of a driving mechanism for moving said grinder on its ways and embodying a shaft having oppositely-rotated pulleys journaled thereon, a clutch intermediate said pulleys and a shifting mechanism embodying catches for holding the clutch in engagement with either one of the pulleys and a knock-off projection moving with the grinder and coöperating with the catches for releasing the same to disengage the clutch; substantially as described.

10. In a glass-grinding machine, the combination with the rotary grinder mounted on ways to traverse transversely of its axis in a plane parallel to the plane of the surface to be ground, and a driving mechanism for effecting such traverse of the grinder embodying a drive-shaft with means for rotating said shaft in opposite directions, a rock-shaft having an arm thereon, an oscillatory driving connection moved by the drive-shaft and shiftable on said arm, a crank-shaft and crank connected with the shiftable driving connection and driving connections between said crank-shaft and driving-shaft for rotating the same once during each traverse movement of the grinder; substantially as described.

11. In a glass-grinding machine, the combination with the rotary grinder and glass-support, of a tank surrounding said grinder and glass-support to immerse the work and grinder at the grinding-point, a receptacle in communication with said tank, and means for reducing or increasing the area of said receptacle to raise or lower the water-level in the tank; substantially as described.

12. In a machine for grinding glass, the combination with the rotary grinder, glass-support and tank surrounding the grinder and glass-support, of a receptacle in communication with the tank below the water-level therein, a driving mechanism and means for reducing the area of the receptacle, connected with said driving mechanism, whereby the water-level may be raised and lowered during the grinding operation; substantially as described.

13. In a glass-grinding machine, the combination with the grinder, glass-support and tank surrounding the grinder and glass-support at the grinding-point, of a receptacle communicating with the tank below the water-level and having flexible walls and means for compressing said receptacle to reduce its area and raise the water-level in the tank; substantially as described.

14. In a glass-grinding machine, the combination with the grinder, glass-support and tank surrounding the grinder and glass-support at the grinding-point, of a receptacle communicating with the tank below the water-level and having flexible walls, of a driving mechanism for effecting a traverse of the grinder and glass-support with respect to each other and for compressing the receptacle to reduce its area and raise the water-level in the tank; substantially as described.

15. In a glass-grinding machine, the combination with the grinder, glass-support and tank surrounding the grinder and glass-support at the grinding-point, of a receptacle communicating with the tank below the water-level and having flexible walls, a compressor for compressing said receptacle to reduce its area and raise the water-level in the tank, a driving mechanism for effecting a traverse of the grinder and glass-support with respect to each other, a cam moved by said driving mechanism and an arm coöperating with said cam to operate the compressor; substantially as described.

16. In a glass-grinding machine, the combination with the grinder, and vertically-movable glass-support, of a tank surrounding the grinder and glass-support at the grinding-point, a flexible bottom in said tank and through which the glass-support passes, and an elevating mechanism for the glass-support located below the tank; substantially as described.

17. In a glass-grinding machine, the combination with the grinder, the vertically-movable glass-support and tank surrounding the grinder and glass-support at the grinding-point, of a flexible bottom in said tank, water-tight connections between said flexible bottom and glass-support, and an elevating mechanism for the glass-support located below the tank; substantially as described.

18. In a glass-grinding machine, the combination with the grinder and bed against which the glass is clamped both located below the level of the glass at the grinding-point, of a clamp located below the bed and movable vertically to clamp the glass against said bed, a tank surrounding the grinder and bed at the grinding-point, a flexible bottom in said tank and an elevating mechanism for the clamp located below the tank; substantially as described.

19. In a glass-grinding machine, the combination with the grinder having a bodily traverse in the plane of the surface to be ground, the bed against the under surface of which the glass is clamped and the plurality of vertically-movable clamps, of independent elevating mechanism for said clamps and a clutch for connecting said elevating mechanism for simultaneous movement; substantially as described.

20. In a glass-grinding machine, the combination with the grinder having a traverse in the plane of the surface to be ground, a bed located on the same side of the plane of the glass with said grinder and against which the glass is clamped and a plurality of clamps located on the opposite side of the plane of the glass, of mechanism for advancing said clamps embodying alined shafts having worms thereon meshing with worm-gears for moving the clamps and the clutch interposed between the adjacent ends of said shafts whereby they may be connected for simultaneous rotation or disconnected to permit of the independent adjustment of the clamps; substantially as described.

CHARLES L. GOEHRING.
WILLIAM TROCHE.

Witnesses:
   H. M. HOLLINGER,
   E. T. HITCHCOCK.